Patented Oct. 2, 1928.

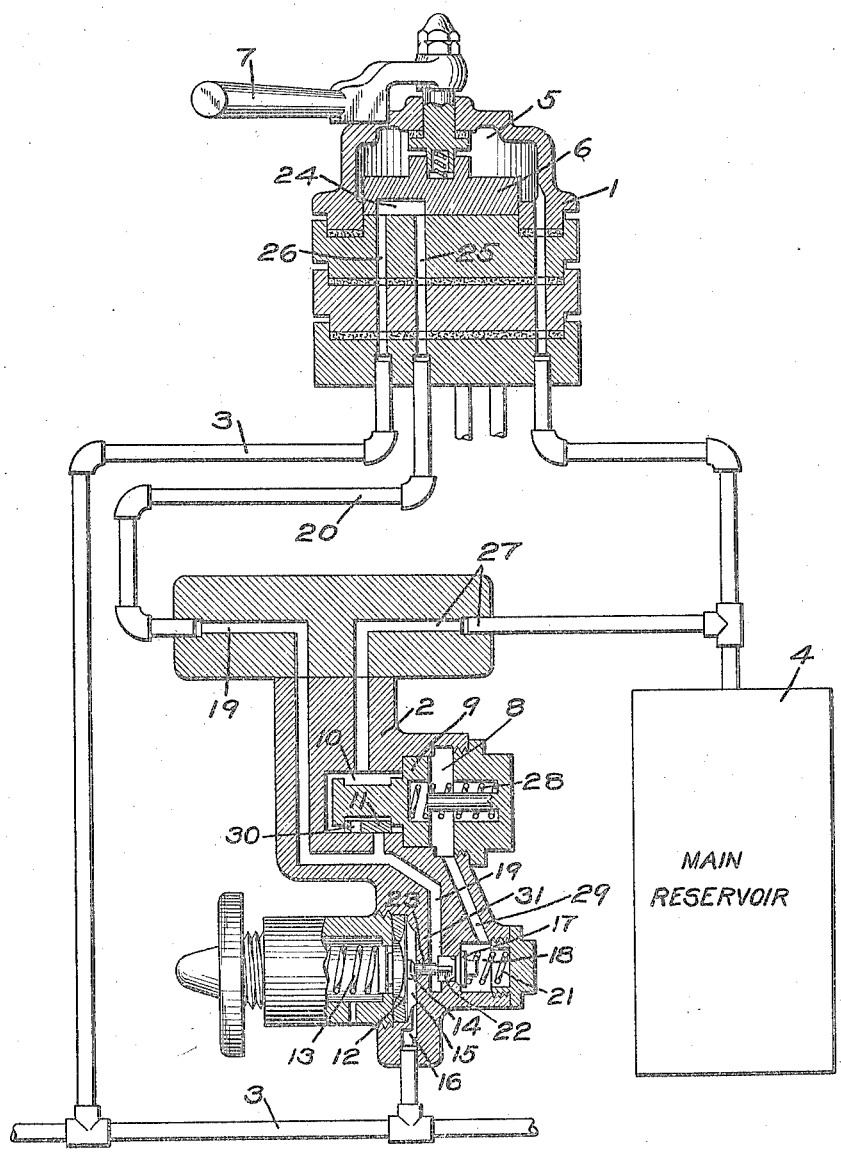

1,685,837

UNITED STATES PATENT OFFICE.

WILLIAM E. DEAN, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

FEED-VALVE DEVICE.

Application filed December 18, 1926. Serial No. 155,733.

This invention relates to fluid pressure brakes and more particularly to means for charging and maintaining the fluid pressure in the brake pipe.

The principal object of my invention is to provide improved means for controlling and maintaining the fluid pressure in the brake pipe.

In the accompanying drawing, the single figure is a sectional view of an apparatus for controlling the fluid pressure in the brake pipe and embodying my invention.

As shown in the drawing, the apparatus comprises a brake valve device 1, a feed valve device 2, a brake pipe 3 and a main reservoir 4.

The brake valve device 1 comprises a casing having a valve chamber 5 containing a rotary valve 6, adapted to be operated by a handle 7.

The feed valve device 2 comprises a casing having a piston chamber 8, containing a loosely fitted piston 9 and a valve chamber 10 containing a slide valve 11 adapted to be operated by piston 9. The regulating portion of the feed valve device comprises a flexible diaphragm 12, subject on one side to the pressure of an adjustable coil spring 13 and adapted to control the operation of a valve 14 contained in diaphragm chamber 15, said chamber being in constant communication with the brake pipe 3 through passage 16. A regulating valve 17, contained in chamber 18, is arranged in alinement with the valve 23 and has a fluted stem 22 which is adapted to be engaged by the stem 23 of valve 14.

The stem 22 of the valve 17 is fluted, so that when said valve is unseated a flow of fluid under pressure will take place from chamber 18 to passage 19, but the stem 23 of the valve 14 is solid and has a close slidable fit in the partition wall 31, so that when said valve is opened there will be no appreciable leakage or flow of fluid under pressure from passage 19 into diaphragm chamber 15.

In operation, when the brake valve handle 7 is turned to running position, as shown in the drawing, cavity 24 in the rotary valve 6 connects passage 25 from the feed valve pipe 20 to passage 26, connected to the brake pipe 3.

If the pressure in the brake pipe 3 is less than the standard pressure carried in the brake pipe, as determined by the adjustment of the regulating spring 13 in the feed valve device 2, the diaphragm 12, being subject to the brake pipe pressure in chamber 15, is moved by the spring 13 so as to close the valve 14, and at the same time open the regulating valve 17 against the pressure of the spring 21.

When the regulating valve 17 is unseated, fluid under pressure is vented from the piston chamber 8, through passage 29, past the opened valve 17, and through passage 19 to the feed valve pipe 20 and thence to the brake pipe 3 by way of cavity 24 in the rotary valve 6 of the brake valve device 1. The piston 10 is then operated by the higher pressure in valve chamber 10, to shift the slide valve 11 so that port 30 in said slide valve registers with the supply passage connected to the passage 19 and the feed valve pipe 20. Fluid under pressure from the main reservoir 4 and the valve chamber 10 is then supplied to the feed valve pipe 20 and thence to the brake pipe 3 through cavity 24 in the rotary valve 6 of the brake valve device.

Fluid under pressure in the brake pipe 3 is supplied to diaphragm chamber 15 by way of passage 16, so that when the pressure in the brake pipe and diaphragm chamber 15 has been increased to the standard pressure, the diaphragm 12 is operated so as to permit spring 21 to close the valve 17 and unseat the valve 14. Fluid pressure then equalizes from valve chamber 10 past the loosely fitted piston 9 and into the piston chamber 8, permitting the spring 28 to return the piston 9 and slide valve 11 to the inner position, as shown in the drawing, in which the supply of fluid from the main reservoir to the brake pipe is cut off.

By connecting the diaphragm chamber 15 directly to the brake pipe 3 through the passage 16, instead of to the feed valve pipe 20, as is the usual practice, the diaphragm 12 is subject directly to the pressure in the brake pipe and this is especially desirable, since a feed valve device when wide open quickly builds up a pressure in the feed valve pipe 20 sufficient to operate the diaphragm 12, and under such conditions the feed valve device intermittently opens and closes, due to fluctuations in pressure in the feed valve pipe 20.

With the proposed construction, the feed valve device may open wide and produce a pressure in the feed valve pipe 20 higher than the standard brake pipe pressure without interfering with the operation of the feed valve device, since the closing of the feed valve device is dependent directly upon the actual pressure in the brake pipe. A more rapid rate of increase in brake pipe pressure is thus provided.

When the brake valve handle 7 is moved to service position to effect a reduction in brake pipe pressure and a consequent application of the brakes, the pressure in diaphragm chamber 15 reduces with the pressure in the brake pipe 3. The pressure in the brake pipe being thus reduced below the setting of the regulating spring 13, the diaphragm 12 will be operated to open the regulating valve 17. In service and service lap positions of the rotary valve 6, however, the feed valve passage 25 is lapped and consequently the pressure in piston chamber 8 of the feed valve device is not reduced by flow past the open valve 17 to the feed valve passage 19, as would be the case in running position of the brake valve device, where the feed valve passage is connected to the brake pipe. Consequently, the feed valve device will not be operated in making service applications of the brakes to supply fluid under pressure to the brake pipe.

With the diaphragm 12 holding the valve 17 open in making a service application of the brakes, the valve 14 will be held seated, so that possible leakage of fluid from the main reservoir into passage 19 will not flow to the chamber 15 and the brake pipe 3, and thus tend to increase the brake pipe pressure, so as to possibly cause a release of the brakes.

The stem 23 of valve 14 is made to fit neatly in the bore provided in the partition wall 31, so that when the valve 17 is only partly open and the valve 14 unseated, leakage around the stem 23 will be reduced to a minimum.

With the above described construction, the usual feed valve connections of the standard brake valve device are employed, so that my invention may be used without making any alteration in the usual standard brake valve device.

Having now described my invention, what I claim as new and desire to secure by Letters Patent, is:—

1. In a fluid pressure brake, the combination with a brake pipe and a brake valve device, of a feed valve device comprising a supply portion for controlling the supply of fluid under pressure to the brake pipe, and a regulating portion constantly subject to brake pipe pressure for controlling the operation of said supply portion, said brake valve device being adapted to connect the supply passage from said feed valve device to the brake pipe.

2. In a fluid pressure brake, the combination with a brake pipe and a brake valve device, of a feed valve device comprising a supply portion for controlling the supply of fluid under pressure to the brake pipe, and a regulating portion constantly subject to brake pipe pressure for controlling the operation of said supply portion, said brake valve device being adapted in running position to connect the supply passage from said feed valve device to the brake pipe.

3. In a fluid pressure brake, the combination with a brake pipe, of a feed valve device comprising a supply portion for controlling the supply of fluid under pressure to the brake pipe, a regulating valve for controlling the venting of fluid from said supply portion to the supply passage of said feed valve device, a diaphragm for operating said valve, and a valve operated by said diaphragm for controlling communication from said supply passage to said diaphragm.

4. In a fluid pressure brake, the combination with a brake pipe, of a feed valve device comprising a supply portion for controlling the supply of fluid under pressure to the brake pipe a regulating valve for controlling the venting of fluid from said supply portion to the supply passage of said feed valve device, a diaphragm subject to brake pipe pressure for operating said valve, and a valve operated by said diaphragm for controlling communication from said supply passage to said diaphragm.

In testimony whereof I have hereunto set my hand.

WILLIAM E. DEAN.